United States Patent
Makke et al.

(10) Patent No.: US 10,349,232 B2
(45) Date of Patent: Jul. 9, 2019

(54) METHOD AND APPARATUS FOR UTILIZING VEHICLES AS MOBILE NETWORK NODES FOR DIGITAL DATA TRANSFER

(71) Applicant: FORD GLOBAL TECHNOLOGIES, LLC, Dearborn, MI (US)

(72) Inventors: Omar Makke, Lyon Township, MI (US); Cynthia M. Neubecker, Westland, MI (US); Perry Robinson MacNeille, Lathrup Village, MI (US); Dehua Cui, Northville, MI (US); David Allen Kowalski, Toledo, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 503 days.

(21) Appl. No.: 14/940,825

(22) Filed: Nov. 13, 2015

(65) Prior Publication Data
US 2017/0142561 A1 May 18, 2017

(51) Int. Cl.
*H04W 4/12* (2009.01)
*H04B 1/3822* (2015.01)
*H04L 29/08* (2006.01)
*H04W 84/00* (2009.01)

(52) U.S. Cl.
CPC ............ *H04W 4/12* (2013.01); *H04B 1/3822* (2013.01); *H04L 67/12* (2013.01); *H04W 84/005* (2013.01)

(58) Field of Classification Search
CPC ......... H04W 4/12; H04B 1/3822; H04L 67/12
See application file for complete search history.

(56) References Cited

U.S. PATENT DOCUMENTS

| | | |
|---|---|---|
| 2006/0068700 A1 | 3/2006 | Habaguchi et al. |
| 2010/0045481 A1 | 2/2010 | Tengler et al. |
| 2014/0155019 A1* | 6/2014 | Schwartz ................ H04W 4/22 455/404.1 |
| 2014/0274064 A1* | 9/2014 | Al-Shalash ........... H04W 24/08 455/437 |
| 2015/0199902 A1 | 7/2015 | Hayee et al. |

* cited by examiner

*Primary Examiner* — Yemane Mesfin
*Assistant Examiner* — Henry Baron
(74) *Attorney, Agent, or Firm* — Frank Lollo; Brooks Kushman P.C.

(57) ABSTRACT

A system includes a processor configured to request delivery of a queued digital message from passing vehicles in wireless communication with the processor, after determining that the vehicle is broadcasting suitable delivery characteristics that make eventual delivery of the message to an intended recipient likely to be facilitated by the vehicle acting as an intermediary carrier of the message.

13 Claims, 4 Drawing Sheets

METHOD AND APPARATUS FOR UTILIZING VEHICLES AS MOBILE NETWORK NODES FOR DIGITAL DATA TRANSFER

TECHNICAL FIELD

The illustrative embodiments generally relate to a method and apparatus for utilizing vehicles as mobile network nodes for digital data transfer.

BACKGROUND

We live in a widely connected world, with internet services and cellular data connections available in almost any location. That said, there are still areas of the world, even in highly technological nations, where limited or no connectivity is available. People in these areas either have to have very expensive connectivity solutions installed (paying for dedicated line installation, paying for high power transceivers, etc.) or they have to travel some distance to obtain a usable signal.

At the same time, vehicles now come equipped with telematics control units that have both WiFi and cellular capability, as well as short range communication capability in the vehicle provided by vehicle computers with BLUETOOTH and other short-range services. These vehicles are everywhere on the roads, and frequently (or at least occasionally) will travel near the areas where no connectivity is available.

SUMMARY

In a first illustrative embodiment, a system includes a processor configured to request delivery of a queued digital message from passing vehicles in wireless communication with the processor, after determining that the vehicle is broadcasting suitable delivery characteristics that make eventual delivery of the message to an intended recipient likely to be facilitated by the vehicle acting as an intermediary carrier of the message.

In a second illustrative embodiment, a system includes a vehicle-based processor configured to deliver a digital message to a message-destination defined by a message delivery characteristic, the message received wirelessly from a queuing-system which a first vehicle containing the processor drove past, received in response to a broadcast of vehicle delivery capabilities by the processor.

In a third illustrative embodiment, a system includes a processor configured to examine received delivery capabilities broadcast by passing vehicles to select a vehicle whose delivery capabilities match a message delivery characteristic and wirelessly transfer a digital message to a selected vehicle, the message having the message delivery characteristic specifying an intended message destination.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
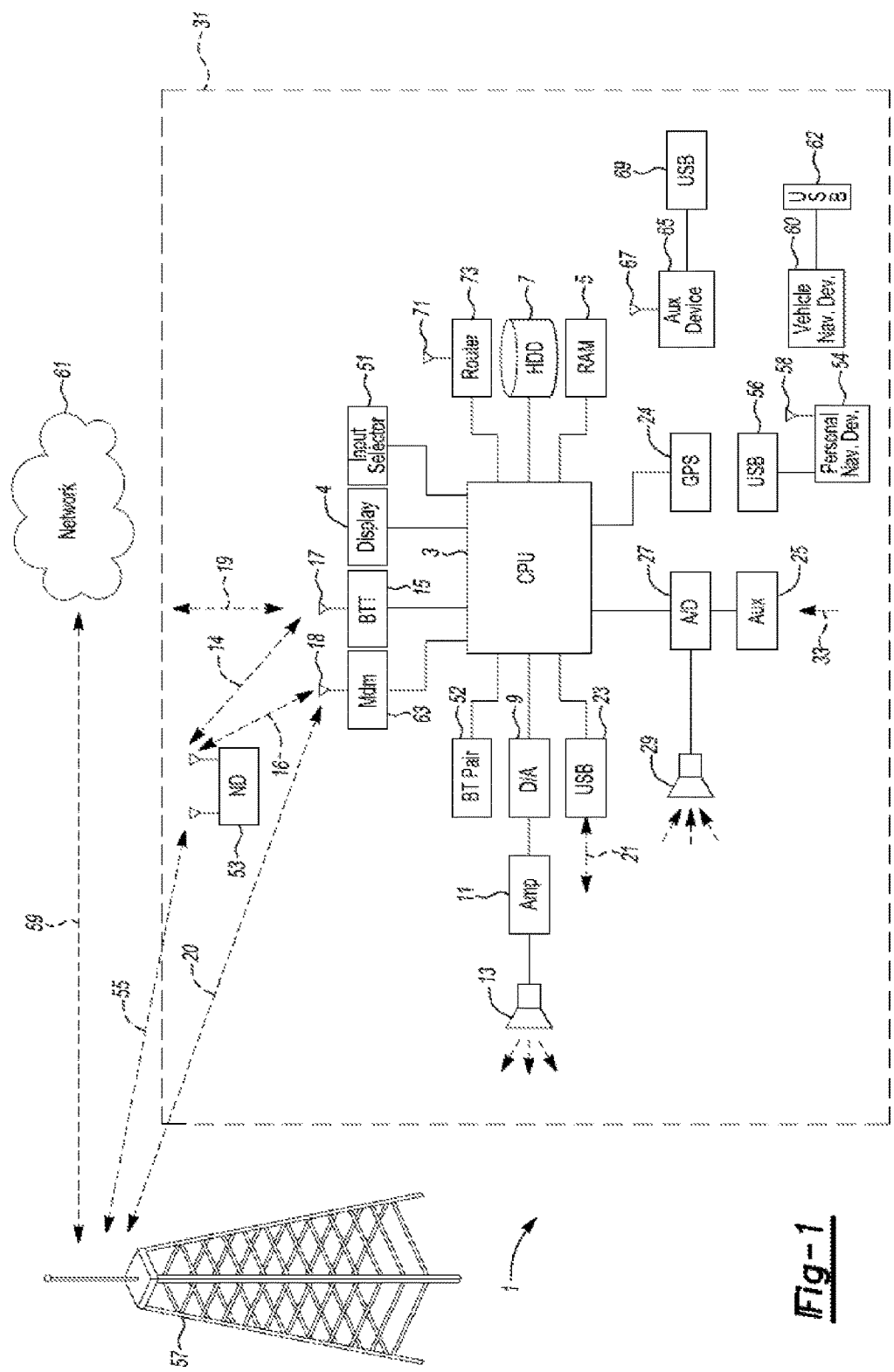
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

In the few populated areas of developed nations, and the vast populated areas of third-world nations where there is little to no cellular connectivity, this presents a huge disadvantage and inconvenience for the people living in these locales. At a minimum, these people will have to either pay excessive costs for obtaining internet service or travel some distance to utilize even simple messaging services and email. This may be completely prohibitive in certain cases, and represents a hassle in other cases.

Fortunately, vehicles may often or occasionally travel through the areas where the limited service exists. Even though the vehicle itself may lose remote connectivity in these areas, the short-range networking capabilities (BLUETOOTH, WiFi) of the vehicle are unaffected (i.e., these capabilities still function). This can be leveraged to connect a party remote from the vehicle to the vehicle, and the vehicle can be utilized as a digital transport for the transfer and delivery of messages and data.

For example, a vehicle passing close to a WiFi router may connect to the router. This router may also be directly or indirectly connected to any number of message owners (i.e., people who have messages or data they want delivered). In one instance, a community or group of homes may place a router as an access point close to a road, and then hardwire into the router for the purposes of delivering messages to the router, which can subsequently be relayed to vehicles. This isn't a common solution currently, but that may largely be because the notion of vehicles as message carriers isn't presently being utilized.

When the vehicle passes by the router, the vehicle's installed WiFi capabilities can be used to connect to the router (which would be a public network, for example) and the vehicle can broadcast data about its delivery capabilities to the network. For example, the vehicle could broadcast a route (since it isn't necessarily desirable to utilize the vehicle as a transport if it is headed into the mountains for a month) and also a common "home" location. A message delivery application can compare the route and home location to areas of known service and message recipients to determine if the vehicle is suitable for delivering the message(s).

Other vehicle capabilities (BLUETOOTH, cellular modem, etc.) can also be broadcast, since a vehicle with remote connectivity in areas with cellular service is a useful transport engine regardless of route or home location, unless those locations also lack cellular service. Once a vehicle has received a message to be delivered, it can travel until it reaches a point where the internet or cellular networks can be contacted, or it can pass the message along to another vehicle that might be headed in a direction where the message might be more quickly delivered. For example, this ability to relay messages might be very useful when there is a message to be delivered to the remote area, since it might be reasonable to place the message on a number of vehicles headed in the general direction of the remote area, each vehicle relaying the message to other vehicles when they are close to the remote area, thus greatly increasing the chances that the message is actually delivered to the remote area (through one of the vehicles passing close enough to the access point to relay the message(s)).

In some communities, if enough people utilize this service, it may even be reasonable to have a designated vehicle travel from the access point to a point of service on a regular basis, effectively acting as a digital post-man for the purpose of transmitting and receiving messages. In another example, it might actually be reasonable to equip mail service vehicles with such a capability, since they travel to most domiciles on a regular basis, and thus might be ideal carriers for digital messages. One method of transferring a message to a vehicle, between vehicles and/or to an intended recipient network includes dedicated short-range communication (DSRC), which is a wireless spectrum assigned for wireless automotive use.

Figure 2:
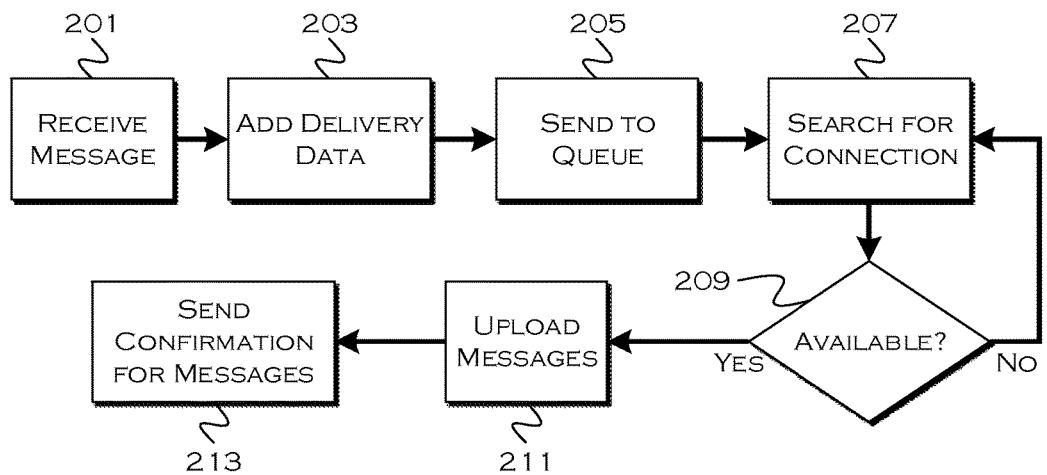
FIG. 2 shows an illustrative example of a message transmission process.

FIG. 2 shows an illustrative example of a message transmission process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a message to be delivered 201. The message is in digital form, but can be delivered to an email, a phone, or even to a physical location or person (if the carrier is willing to assist in such delivery). Delivery data is added to the message 203, which indicates the parameters for delivery. These can include, for example, a physical location, a party, a picture of the recipient or a recipient location, a network address, a mobile number, etc.

The message is then sent to a delivery queue 205, where it waits with other messages for an opportunity to be transferred to a vehicle that can act as a suitable carrier. As messages queue up, the process searches for a suitable carrier for one or more messages 207. For example, the messages may queue in a system near the roadside provided with a wireless access point. The system will queue the messages and scan passing vehicles for communication opportunities and drivers/vehicles that are capable and/or willing to participate in message carrying and delivery. If a vehicle becomes available 209, the process will upload one or more messages to that vehicle 211. At this point, a confirmation can be sent to the message owner 213 (i.e., the originating party), letting the owner know that the message delivery process has begun.

Figure 3:
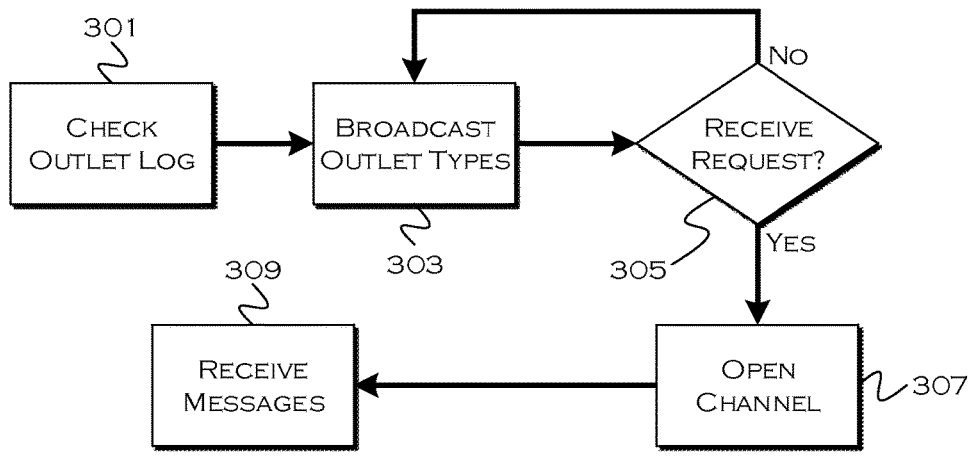
FIG. 3 shows an illustrative example of a message carrier notification process.

FIG. 3 shows an illustrative example of a message carrier notification process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative embodiment, a participating vehicle broadcasts its delivery capabilities and other relevant information to any access points or other points where a message may be waiting. In this example, the vehicle keeps a log of its recent capabilities (i.e., what networks it has recently encountered and/or commonly has access to, such as, but not limited to, a cellular network, one or more local area networks (LANS), one or more internet access points, and/or any locales that may be relevant to a physical message delivery location 301. These delivery options are broadcast by the vehicle 303, so that a message sender knows whether or not the vehicle is suitable for delivering a particular message.

If the process receives a request to broadcast the message 305, the process will open a communication channel (BLUETOOTH, WiFi, etc.) with the access point or local system requesting message delivery 307. At this point, any messages that are to be delivered by that particular vehicle are transferred to the vehicle 309.

Figure 4:
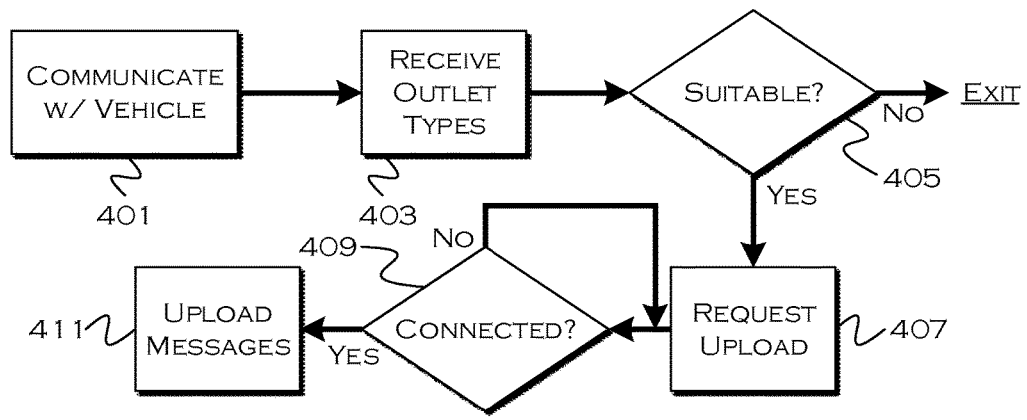
FIG. 4 shows an illustrative example of a message transfer process.

FIG. 4 shows an illustrative example of a message transfer process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

This is an illustrative example of a vetting process, whereby a message queuing system or message originating system determines if a passing vehicle is suitable for message delivery. The queuing or originating system can be an access point, a computing system (laptop, desktop, tablet, etc.) or even a mobile device (e.g., the user types a text message on a mobile device and it is queued on the device for transfer to a passing vehicle).

The message originating or queuing system communicates with a passing vehicle 401 and obtains the various outlets (delivery options) that are being broadcast by that particular vehicle 403. Since a bi-directional communication process may not yet be established with the vehicle, the process may simply receive broadcast information relating to the vehicle's delivery capabilities. The process examines the capabilities to determine if those capabilities are suitable for delivering a particular message 405.

For example, without limitation, if the message is to be delivered to a physical location, the process may examine a current vehicle route and/or common vehicle locations (such as a "home" location). If the vehicle is headed to or will likely be within a physical delivery area within a reasonable period of time, the process can confirm that the physical location of the vehicle is likely to be suitable for message delivery. In another example, if the message is to be delivered over a cellular network, the process may determine if the vehicle has access to a cellular connection (e.g., a modem or BLUETOOTH connection to a cellular device) and whether that will likely soon be in an area with coverage (although the mere existence of a cellular connection may be sufficient, since it may be assumed that the vehicle will, at some point, also have cellular service).

In still another example, the message may be an email that requires internet access or network access for delivery. In this case, the process may determine if the vehicle has data delivery capabilities (WiFi access and/or a cellular data connection that can be used to access the internet). If the vehicle is suitable for delivering a message, based on the outlet capabilities, the process may request that one or more messages be uploaded to the vehicle 407. On the vehicle side, the driver may be given an option to "carry" the message(s), or the driver may have elected to simply opt-in as a delivery source. If the driver agrees (implicitly or explicitly), the process may establish a connection with the vehicle 409 and upload one or more messages for delivery 411.

Figure 5:
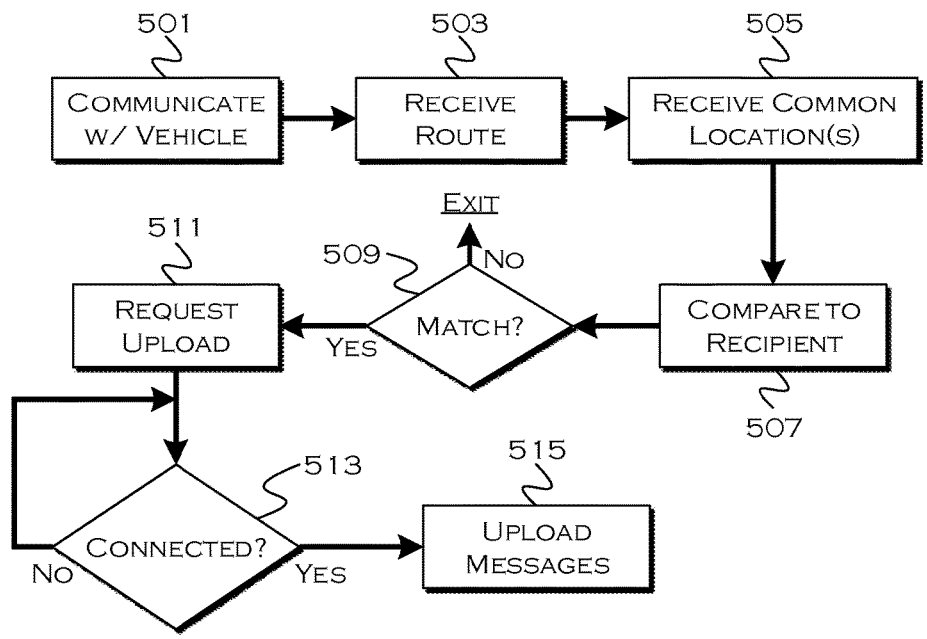
FIG. 5 shows an illustrative example of a vehicle selection process.

FIG. 5 shows an illustrative example of a vehicle selection process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process examines the physical delivery capabilities of the vehicle (i.e., whether the vehicle is traveling to a physical location suitable for message delivery. This can include both messages to be delivered to an actual physical location and/or whether the vehicle will likely pass through a physical location that corresponds to known network or cellular access. The process communicates with the vehicle 501, and, in this example, receives a present vehicle route 503, which indicates where the vehicle is likely headed next.

Also, in this example, the process receives one or more common locations to which the vehicle travels (e.g., home location, work location, etc.) 505. Even if a vehicle is not presently headed to a desirable location, the garaging location or common parking location of the vehicle may indicate that it will likely soon travel to the desired area, which may be sufficient, depending on the particular model enacted. The destination/route and/or common vehicle locations are compared to physical delivery characteristics associated with the message or known to be needed to deliver the message 507, and if there is a suitable match 509, the process will request to upload the message(s) for delivery 511. In still another example, the mere fact that a vehicle will soon be traveling on a heavily traveled road may be sufficient, since the vehicle may also be able to relay the message to one or more other vehicles by virtue of accessing the heavily traveled road.

Once the upload is requested and the process connects to a vehicle computer 513 (via BLUETOOTH, WiFi, etc.), the process uploads the message(s) for delivery using the particular vehicle 515.

Figure 6:
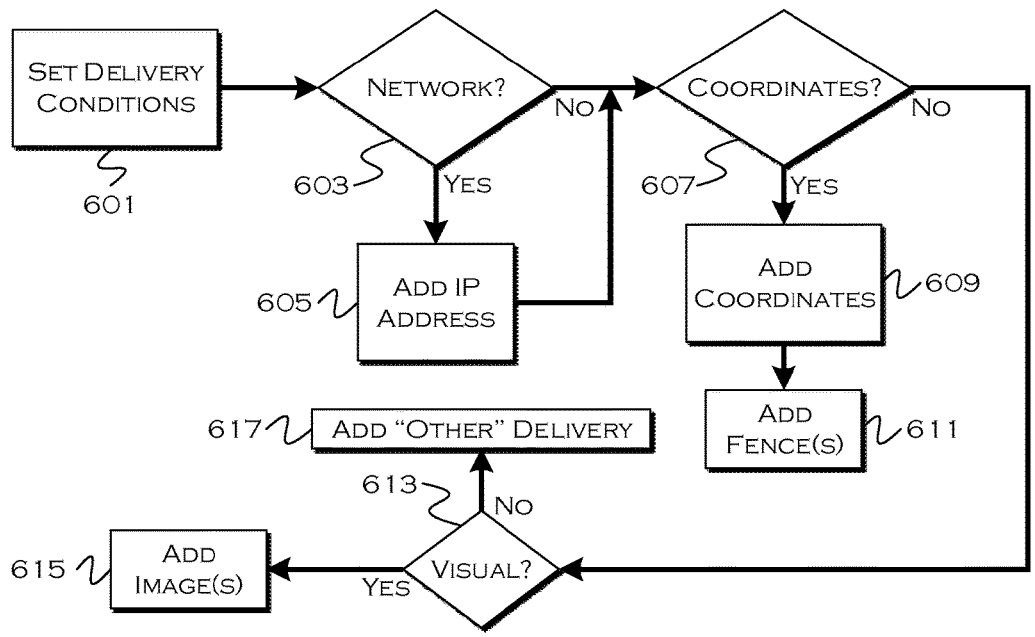
FIG. 6 shows an illustrative example of a message delivery process.

FIG. 6 shows an illustrative example of a message delivery process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a person prepares a message for delivery. This could be an email message to be delivered to the cloud (where it can be appropriately routed), an SMS or text message to be delivered to a cellular network (for eventual transmission). This could even be a message where physical delivery is requested (assuming the driver of the vehicle is willing to assist, such as "please tell X that their services are needed at Y location). The recipient of the message and the type of delivery, among other things, can be set as delivery conditions 601.

The process first determines if a network (e.g., the internet or a cellular network) is designated as a delivery condition 603. If so, the process will add an IP address (or mobile number to which a cellular message is to be delivered) 605. Next, the process determines if any physical delivery is required (such as delivering the message in person, or delivering the message to a physical network router located at a specific location) 607. If a physical location is part of the delivery protocol, the process will add coordinates 609 as one of the delivery specifications. In this example, the process also adds one or more geo-fences surrounding the coordinates, which can be used in conjunction with a vehicle home location or vehicle route to determine if a vehicle is suitable for delivering the message to the specified physical location. For example, four fences could be set, at one, five, ten and twenty miles from the target location. The first fence could designate any vehicle traveling or having a home location within twenty miles as a potential carrier.

Once the initial vehicle is selected, the second fence could be used to relay the message to one or more vehicles traveling within ten miles of the selected location. This could be done at any time when the initial carrier passes by such a vehicle, or once the initial carrier has reached the twenty mile fence. In a similar manner, vehicles for relay can be selected based on the five mile and one mile fences, so that vehicles can be quickly and easily identified as appropriate for message delivery, without having to include a complicated application on the vehicles or with the message package to determine if the message can be delivered by a potential carrier.

Finally, in this example, the process determines if there are any visual characteristics associated with the message delivery 613. Assume, for example, that a message is to be delivered to Bob at the local grocery store. A picture of Bob may be included so that the delivering party can easily identify Bob. Any needed images can be added at this point 615. Also, any other delivery characteristics 617 can be added to the message, as needed.

Figure 7:
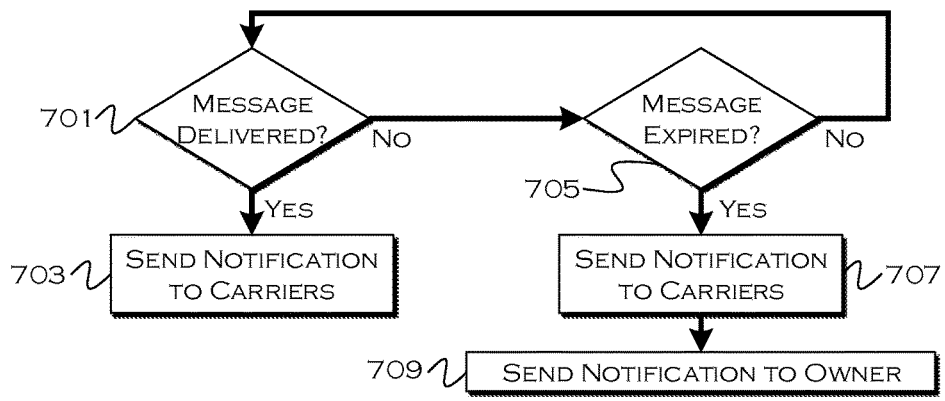
FIG. 7 shows an illustrative example of a message delivery notification process.

FIG. 7 shows an illustrative example of a message delivery notification process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

All of the processes described for determining if a vehicle is a suitable carrier for a message may also be utilized by a vehicle for determining if another vehicle passing by the original vehicle is suitable for relaying the message. In the same manner that the message is originally transferred to the original carrier vehicle, the message may be further transferred to one or more additional delivery vehicles if they have suitable characteristics for delivery. In the example shown in FIG. 7, the message includes some tracking of the IP addresses of the vehicles on which it has resided, so that when the message is delivered to the recipient, the vehicles can be informed of the delivery and thus the remaining vehicles can stop attempting to deliver the message. IN another example, the message may be deleted once transferred, assuming that the recipient vehicle will eventually result in delivering the message. The message may also expire after some period of time, which will allow the messages to be "cleaned up" off of vehicles on which they reside.

In this example, when the message is eventually delivered 701 (e.g., the vehicle encounters a location or accesses a network suitable for completing delivery), the vehicle will send a notification to the other vehicles which have acted as carriers 703. This allows the other vehicles to delete the message. If each vehicle keeps track of the IP addresses of the vehicles to which the message was passed, then by contacting the original vehicle, that vehicle can contact it's down-the-line carriers, and so forth, so the message can be quickly deleted from all of the current carriers (assuming they are online at the time).

Also, in this example, the message has an expiration date/time 705, which will help clean up old messages that have been likely delivered, but for which confirmation has not yet been received. Once the message expires 705, the process will also send a notification to the other carriers 707 (although this may not be necessary if all carriers have the same expiration date/time stored). In this instance, a notification is also sent to the message owner (originator) 709 so that the owner knows that the message was deleted from one or more systems due to expiration (and may or may not have been delivered). Of course, if the message owner is located at the remote location, it may take some time for the notification to reach the owner, via the reverse of the delivery process above (i.e., an application running on a server on behalf of the owner can route messages to the owner in a similar manner, by attaching them to vehicles that are, based on route, for example, likely to pass by the owner's location).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
request delivery of a queued digital message from a first passing vehicle in wireless communication with the processor, the request responsive to both;
receiving message delivery requirements broadcast by the first vehicle and comparing the requirements to a current route; and
determining that the current route of the second vehicle, including the processor, will bring the second vehicle to a location where access to a broad digital network is available, making the second vehicle a candidate for furthering delivery of the message, as indicated by the message delivery requirements, by acting as an intermediary carrier of the message.

2. The system of claim 1, wherein the broad digital network includes a cellular network.

3. The system of claim 1, wherein the broad digital network includes an internet connection.

4. A system comprising:
a vehicle-based processor configured to:
deliver a digital message to a message-destination defined by a message delivery characteristic, the message received wirelessly from a queuing-system which a first vehicle containing the processor drove past, received in response to a broadcast of vehicle delivery capabilities by the processor.

5. The system of claim 4, wherein the message delivery characteristic includes a network address, and the processor is configured to deliver the message once connectivity to a network, over which the network address can be reached, is established.

6. The system of claim 4, wherein the message delivery characteristic includes a mobile phone number, and the processor is configured to deliver the message to a cellular network once a connection to the cellular network is available.

7. The system of claim 4, wherein the processor is configured to broadcast delivery capabilities that include common physical locations where the first vehicle is parked.

8. The system of claim 4, wherein the processor is configured to broadcast delivery capabilities that include a present vehicle route.

9. The system of claim 4, wherein the processor is configured to broadcast delivery capabilities that include vehicle connectivity capabilities.

10. The system of claim 4, wherein the processor is configured to determine that a second vehicle, in communicable proximity to the first vehicle, is a viable candidate for message delivery to the message-destination, based on second vehicle message delivery capabilities, broadcast by the second vehicle and received by the processor, and to subsequently deliver the message wirelessly to the second vehicle.

11. The system of claim 4, wherein the queuing-system includes a mobile device.

12. The system of claim 4, wherein the queuing-system includes a computer.

13. A system comprising:
a processor configured to:
examine received delivery capabilities broadcast by passing vehicles to select a vehicle whose delivery capabilities match a message delivery characteristic; and
wirelessly transfer a digital message to the selected vehicle, the message having the message delivery characteristic specifying an intended message destination.

* * * * *